July 28, 1970 R. D. W. BERG 3,521,919
LOCKABLE LATCH MECHANISM
Filed June 11, 1968

INVENTOR
ROBERT D. W. BERG
BY
Mason, Mason & Albright
ATTORNEYS

United States Patent Office 3,521,919
Patented July 28, 1970

3,521,919
LOCKABLE LATCH MECHANISM
Robert D. W. Berg, Bloomington, Minn., assignor to De Bourgh Manufacturing Company, Minneapolis, Minn., a corporation of Minnesota
Filed June 11, 1968, Ser. No. 736,232
Int. Cl. E05c 5/00
U.S. Cl. 292—7
3 Claims

ABSTRACT OF THE DISCLOSURE

A locking mechanism including a handle coupled with a turnable locking bar which cooperates with an intermediate pivotable dog. The locking bar interfits in a recess in one end of the dog. The other end of the dog is held by a projecting latch when the latter is locked.

---

This invention relates to a locking mechanism, preferably of the type used on an athletic locker wherein a locked latch or latch bolt restrains movement of the handle so that the locker cannot be opened. Movement of the handle can be effected through a turnable bar when the latch or bolt is withdrawn.

It is an object of the present invention to provide a simple, efficient locking mechanism for a handle actuating mechanism which can be used with a lockable latch or latchbolt, the latter being associated with a conventional combination or key type lock.

Figure 1:
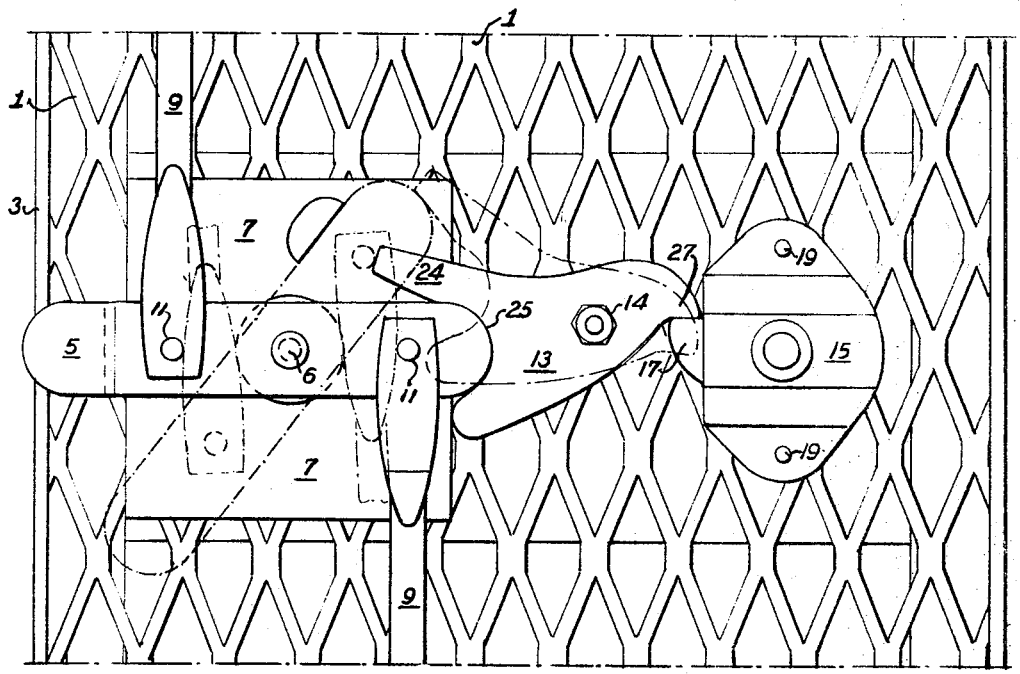
Figure 2:
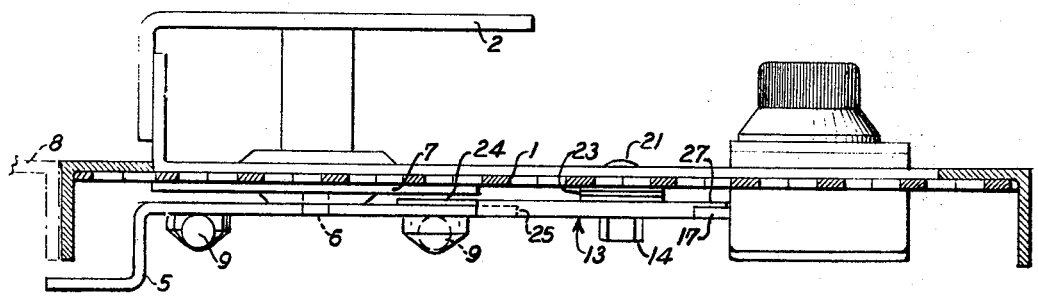

These and other objects will be apparent from the following description and drawings in which:

FIG. 1 is a rear elevation of the locking mechanism mounted on an athletic locker door, and FIG. 2 is a bottom plan view of the FIG. 1 arrangement.

In FIG. 1 a ventilated locker door 1 of the perforated or open-mesh type used in athletic lockers has a frame 3 and a turnable locking bar 5 which can be turned by handle 2 to the dotted line position about pin 6 in plate 7 mounted in the door. One end of the bar 5 cooperates with jamb 8 and thus prevents the door 1 from swinging when the bar is in normal locked position (FIG. 2). In addition, bar 5 is pivotally coupled to locking rods 9 with pins 11 and the rods in normal locked position are urged beyond the jamb or into perforated plates (not shown) preventing the door 1 from being swung. When bar 5 is turned about pin 6 to the dotted line position, the rods 9 are withdrawn and the bar is swung away from jamb 8 permitting the door to be opened.

A lock 15 is affixed to door 1 and spaced from locking bar 5. Lock 15 has a movable latch 17 that can be reciprocated or simply swung out of locked position to permit dog 13 to pivot about bolt 14 to dotted line position. Lock 15 is shown as a combination lock affixed to door 1 with rivets or screws 19, but it will be understood that other latches and bolts are suitable providing the latch or bolt 17 can be locked in extended position. In extended position, the latch 17 restrains the dog which in turn holds locking bar 5 in a horizontal, locked position.

Bolt 21 is fitted with a nut 14 and a plurality of spacers 23 are fitted on the bolt between the door 1 and dog 13 to allow pivoting. Dog 13 has a recess 25 to receive one end of locking bar 5 and the other end of the dog has a pointed portion 27 with a flat edge that bears on the top surface of latch 17.

It will be noted that the recessed portion 25 of the dog has an extended top portion 24 which permits the dog to be swung by the locking bar to dotted line position as shown in FIG. 1. Thus, even when fully pivoted, the dog remains in contact with the rounded end of locking bar 5 and the handle 2 can be turned to move the mechanism, including the dog, back to normal locked position.

The unusual configuration of dog 13 resembles a hawk with the head corresponding to pointed portion 27 and the tail to extended portion 24. The dog 13 is pivotable to the dotted line position shown in FIG. 1 but normally can be pivoted no further so that the mechanism remains articulated from unlocked to locked position and vice versa by actuation of handle 2.

While a detailed description of the invention has been set forth in the described method for purpose of illustration, it will be apparent to those skilled in the art that many modifications may be made without departing from the principles of the invention.

I claim:

1. A locking mechanism comprising a turnable bar with movable locking means pivotally connected to said bar and a handle connected to said bar for turning same, a lockable latch and an intermediate pivotable dog positioned adjacent one another and said bar, one end of said dog having a recess for receiving said bar, the other end of said dog abutting said latch in locked position, said latch being withdrawable whereby said dog can be pivoted and said bar can be turned by said handle to move said locking means to an unlocked condition.

2. The mechanism of claim 1 wherein said locking means comprises rods pivotally connected to said bar on each side of the pivot of said handle whereby the turning of said bar by said handle moves said rods in opposite directions.

3. The mechanism of claim 1 wherein said dog resembles a hawk in configuration with its head abutting said latch and its tail provided with a recess into which a rounded end of said bar is fitted, said bar, dog and lock being mounted on substantially the same horizontal plane whereby said parts are in frictional engagement with one another, both in locked and unlocked condition.

References Cited

UNITED STATES PATENTS

| 1,155,953 | 10/1915 | Morrow | 292—108 X |
| 1,399,167 | 12/1921 | Steyerwald | 292—7 |
| 1,466,489 | 8/1923 | Starrett | 70—135 |
| 1,566,013 | 12/1925 | Hurd | 70—135 |
| 2,523,845 | 9/1950 | Roseburrough | 292—108 |

FOREIGN PATENTS 17,312    8/1898    Switzerland.

RICHARD E. MOORE, Primary Examiner
E. J. McCARTHY, Assistant Examiner

U.S. Cl. X.R.
292—336.3